March 4, 1958 — J. T. DAVIDSON ET AL — 2,825,403

STRIP SEVERING MECHANISM

Filed Feb. 2, 1956 — 7 Sheets-Sheet 1

INVENTORS
JOHN T. DAVIDSON
PERCY G. STIMSON
BY Tom Walker

March 4, 1958  J. T. DAVIDSON ET AL  2,825,403
STRIP SEVERING MECHANISM
Filed Feb. 2, 1956  7 Sheets-Sheet 2

Fig.1A

INVENTORS
JOHN T. DAVIDSON
PERCY G. STIMSON
BY Tom Walker

March 4, 1958

J. T. DAVIDSON ET AL 2,825,403

STRIP SEVERING MECHANISM

Filed Feb. 2, 1956

INVENTORS
JOHN T. DAVIDSON
PERCY G. STIMSON

BY Tom Walker

Fig.3

March 4, 1958   J. T. DAVIDSON ET AL   2,825,403
STRIP SEVERING MECHANISM

Filed Feb. 2, 1956   7 Sheets-Sheet 5

INVENTORS
JOHN T. DAVIDSON
PERCY G. STIMSON
BY
Tom Walker

March 4, 1958  J. T. DAVIDSON ET AL  2,825,403
STRIP SEVERING MECHANISM

Filed Feb. 2, 1956 7 Sheets-Sheet 7

INVENTORS
JOHN T. DAVIDSON
PERCY G. STIMSON
BY
Tom Walker

United States Patent Office 2,825,403
Patented Mar. 4, 1958

2,825,403

STRIP SEVERING MECHANISM

John T. Davidson and Percy G. Stimson, Dayton, Ohio, assignors to The Standard Register Company, Dayton, Ohio, a corporation of Ohio Application February 2, 1956, Serial No. 563,006

5 Claims. (Cl. 164—49)

This invention relates to strip severing apparatus, operable to cut successive lengths from a continuous strip material fed thereto. While not so limited, the invention has particular application in the reduction of a continuous strip of printed form stationery to individual form components. Thus, in the operation of the apparatus, it is contemplated that the leading end of the strip or web shall be intermittently advanced, to position successive forms at a severing position, the severing apparatus acting successively to cut the strip into individual sheets for ejection. Apparatus of the kind described has a useful purpose in banks and mercantile and industrial establishments wherein large quantities of duplicate forms, for example check drafts, are issued in the normal course of business.

The object of the invention is to simplify the construction as well as the means and mode of operation of strip severing mechanism, whereby such mechanism may not only be economically manufactured, but will be more efficient and satisfactory in use, adaptable to a wide variety of applications, and be unlikely to get out of repair.

A further object of the invention is to correlate strip feeding and severing operations in an apparatus of the kind described for accurate and rapid separation of continuous record strip material into its individual form components.

Another object of the invention is to provide for quick and accurate separation of forms from a strip, as described, irrespective of whether or not the forms are initially separated in the strip by preweakened transverse division lines.

A further object of the invention is to provide for variation in the length of the cut forms by varying the extent of each increment of movement of strip feeding means in relation to operation of the severing mechanism.

Still another object of the invention is to provide for positive feeding of the strip through a pin wheel mechanism settable into and out of a cooperative relation with the strip.

A still further object of the invention is to provide for continuous running of the strip severing apparatus under the control of separate start and stop devices conveniently arranged in adjacent relation to one another at the front of the machine for manipulation by the hand of the operator.

A still further object of the invention is to enable the accurate cutting of multiple copy strip material held in registration by pin type strip feeding devices.

A further object of the invention is to provide a strip severing mechanism possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings, wherein is shown one but obviously not necessarily the only form of embodiment of the invention.

Like parts are indicated by similar characters of reference throughout the several views.

Referring to the drawings, strip severing apparatus in accordance with the illustrated form of the invention has the unitary character of a machine. A frame structure 20 forms the principal support of the machine and houses an electric motor 21 which under the control of a switch unit 22 and through drive belts 23 operates to rotate a flywheel 24 located above the frame 20 and enclosed by a hood 25. The flywheel 24 is rotatably mounted on one end of a crank shaft 26 and is enabled selectively to drive such shaft in a rotary sense through a clutch unit 27. Near its opposite ends, the shaft 26 is received in bearing housings 28 and 29 secured to the upper end of cylindrical rods 31 and 32, respectively, the opposite or lower ends of which are fixed to a plate 33 which is situated on top of the frame 20 and represents the principal support for the strip severing and feeding mechanisms.

Figure 8:
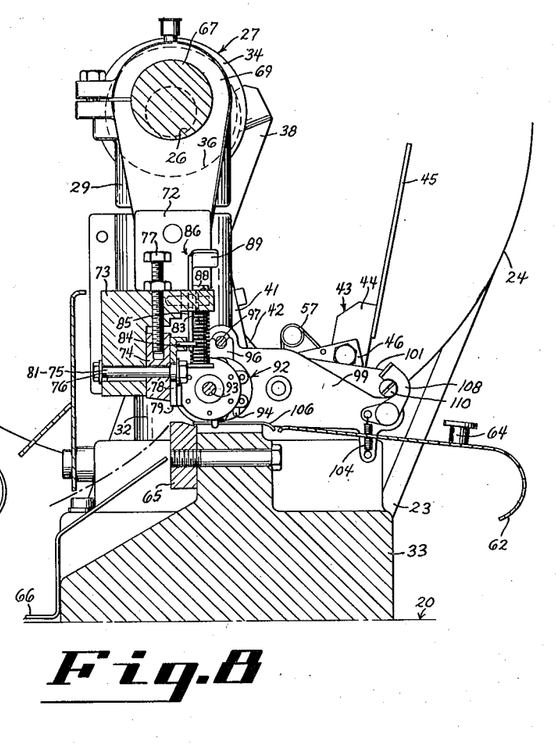
Fig. 8 is a view in cross section taken substantially along the line 8—8 of Fig. 2.
Figure 9:
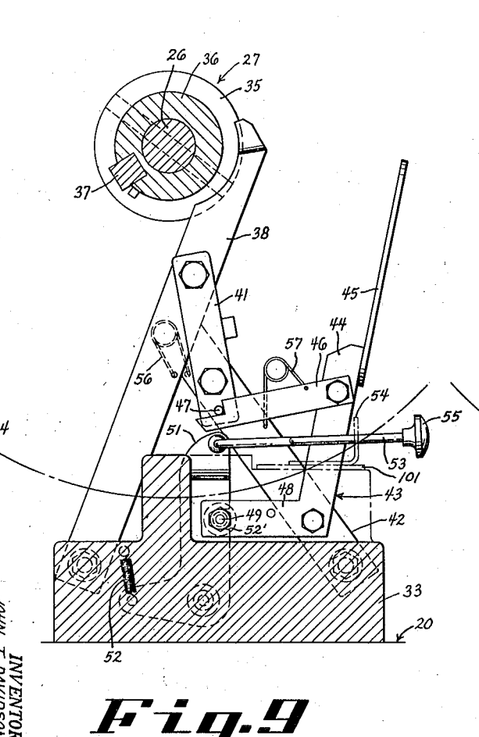
Fig. 9 is a view in cross section, taken substantially along the line 9—9 of Fig. 2, and showing the clutch control mechanism held in a position of clutch engagement.
Figure 10:
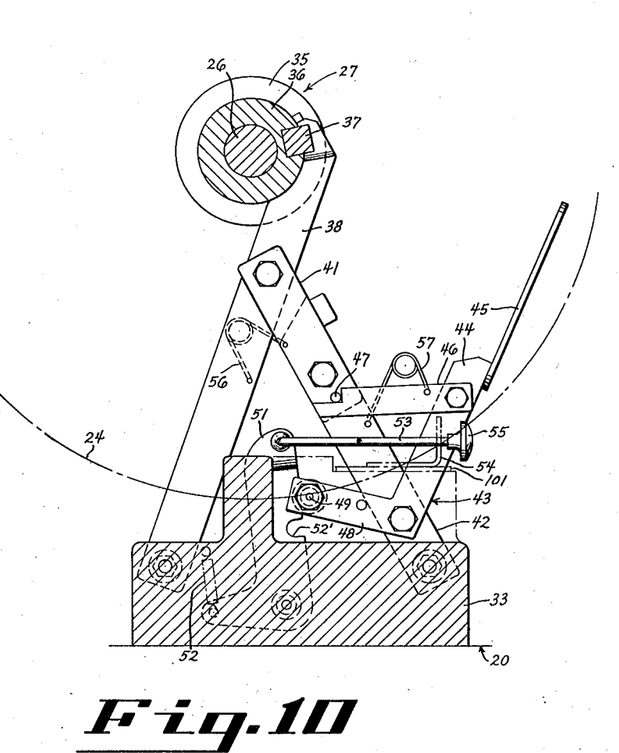
Fig. 10 is a view like Fig. 9, showing the clutch control mechanism released from its holding position and with the clutch returned to disengaged position.

The clutch unit 27 is a conventional kind which includes a pair of spaced apart plates 34 and 35 on the shaft 26, one secured thereto and the other secured to the hub of the flywheel 24. A hub 36 on one of such plates carries a laterally displaceable pin 37 through which a driving connection between the plates 34 and 35 is made and unmade. An arm 38 is pivotally connected at its one end to the base plate 33 and at its other end is formed with an inclined portion adapted to engage the sleeve 36 and to displace the pin 37 laterally when so positioned in a manner to disengage the clutch or to disable the driving connection between the plates 34 and 35. A link 41 is pivotally connected to the arm 38 and also to a relatively stationary arm 42 fixed to the base plate 33. A lever 43 is pivotally mounted on the arm 42 and has an upstanding arm 44 to which is secured a plate 45 positioned for manipulation by the hand of the operator. A pawl 46 engages a pin 47 on the lower end of the link 41 in such manner that a forward pushing motion exerted upon the plate 45, rocking the lever 43 to the left as viewed in Fig. 8, rocks the link 41 in a clockwise direction about its connection on arm 42 whereby to retract the arm 38 from the position shown in Fig. 10 to the position shown in Fig. 9. The pin 37 thereby is released to engage the clutch or to establish a driving relationship between the flywheel 24 and the shaft 26. The lever 43 has a horizontally extending arm 48, on the outer end of which is a laterally projecting stud 49. A latch member 51 is pivotally mounted on the base 33 and is urged by a spring 52 in a direction to engage the front or right hand edge thereof with the stud 49. There is formed in such front edge of the lever 51 a recess 52' adapted to receive the stud 49 when the lever 43 is rocked as before described to engage the clutch. The member 51 rocks, it will be understood, to achieve an interengaging latching relationship with the stud 49 positively to hold the lever 43 in an actuated position. The latch member 51 is disabled or released by a rod 53 having a sliding mounting in a bracket 54 on the base 33. One end of the rod 53 is connected to the upper end of latch member 51 and the other end thereof has a knob 55 thereon to facilitate axial motion of the rod by the operator. The rod 53 thus has the character of a plunger which is presented in side by side relation with the plate 45 for manual operation. Depression or actuation of such plunger, it will be understood, rocks the latch member 51 against the urging of spring 52 in a direction to release the stud 49. So released, the lever 43 is free to return to its normal position as shown in Fig. 10, movement to such position being accomplished by a spring 56 interposed between the arm 38 and the link 41 and by a spring 57 interposed between the arm 42 and pawl 46. In accordance with the construction and arrangement of parts, therefore, a pushing force applied to the plate 45 is effective to engage the clutch for rotation of the crank shaft 26 while a similar force applied to the push rod 53 is effective to disengage the clutch and so discontinue rotation of the crank shaft.

The machine acts upon a strip 58 which, as shown, may be supplied from a pack 59 supported on a table 61 at the front of the frame 20. The strip 58 extends upward from the pack 59 and passes over and across the base plate 33, being guided in its movement by a deflector element 62 secured to supports 63 on the base 33. The strip passes between guide studs 64 set in the deflector 62 and passes over a stationary cutter element 65 to the rear of the machine where it may refold upon a tray 66.

The crank shaft 26 is in parallel overlying relation to the cutter element 65 and in transverse relation to the path of movement of the strip 58. An intermediate portion of the crank shaft is formed with an enlarged eccentric part 67 on which a pair of laterally spaced apart arms 68 and 69 are rotatably mounted. The arms 68 and 69 extend downwardly from the crank shaft and are connected by U-shaped blocks 71 and 72 to a transverse bar 73 to which a cutter element 74 is secured by bolts 75. The latter are received in oversize openings 76 in the bar 73 in such manner as to permit of a vertical adjustment of the cutter element 74 by screw studs 77. Rotation of the crank shaft 26 is effective, it will be understood, to raise and lower the bar 73 and thereby the cutter element 74 which may thus be termed the movable element as opposed to the relatively stationary element 65. The cutter elements 74 and 65 are arranged in an offset relation and their cooperative faces are so formed as to permit and to cause a severing of the interposed strip during the descending or lowering movement of the bar 73.

Figure 6:
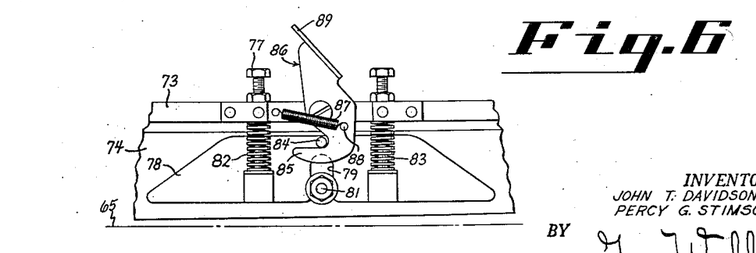
Fig. 6 is a detail view of a pressure plate device comprised in the strip severing mechanism, and showing an alternate position thereof with respect to Fig. 2.

Mounted on the front of the movable cutter element 74 is a pressure plate 78 which is adapted to engage and hold down the strip upon the top of the stationary cutter element 65 prior to contact by the cutter element 74 with the strip, and which so serves a function of particular utility in the cutting of multi-copy strips. The plate 78 has a slot 79 opening through its lower edge and receiving a stud 81 on the front of the element 74. Compression springs 82 and 83 are interposed between brackets on the plate 78 and an overhanging portion of the bar 73 in such manner as to urge the plate 78 downward to its normal position wherein the lower edge of the plate lies slightly below the lower edge of the cutter element 74. Motion of the plate 78 under the influence of the springs 82 and 83 is limited by engagement thereof with the top of cutter element 65. In the cutting operation it will be understood the springs 82 and 83 yield after contact of the pressure plate with the strip, permitting the cutter element 74 to continue downward to sever the strip, the stud 81 being carried downward in the slot 79 as a part of such continued motion. The interengagement of the slot 79 and stud 81 also enables a retracting of the pressure plate should its use not be required or to facilitate the original introduction of the leading end of a strip into the machine. Thus, above the slot 79 the pressure plate 78 has a projecting stud 84 engageable by a cam finger 85 on a latch lever 86 pivotally mounted on the overhanging portion of the bar 73. A spring 87 is tensioned between the bar 73 and a stud 88 on the lever 86 in a manner to hold the latch lever either in its non-operating position shown in Fig. 2 or in its operative latching position shown in Fig. 6, adjustment of the lever to its alternate positions being effected manually by grasping a finger piece 89 thereon.

Further in accordance with the illustrated embodiment of the invention, feeding of the strip 58 is by laterally spaced apart pin wheel units 91 and 92 on a shaft 93 and embodying radially projecting pins 94 which are engageable in marginal perforations 95 in the strip to advance the strip in response to rotation of the pin wheel units in a manner well known in devices of this kind. The pin wheel units further include anchor members 96 engaged with a cross bar 97, the bar 97 and the shaft 93 being in parallel relation and extending transversely across the path of movement of the strip. The ends of the shaft 93 and rod 97 are mounted in common end plates 98 and 99. The latter is pivotally mounted at an intermediate point to a bracket 101 stationarily mounted on the base plate 33. The plate 98 is similarly mounted on a bracket 102 which is in turn mounted on another bracket 103 fastened to the plate 119. The assembly comprising plates 98 and 99, shaft 93 and rod 97, and pin wheel units 91 and 92 defines a frame mounted for pivotal movement on the relatively stationary brackets 101 and 192 in order that the pin wheel units may be raised from and lowered into cooperative relation with the strip, or more particularly with the perforations 95 therein. Springs 104 and 105 extend between the respective plates 98 and 99 and their mountings in a manner to raise the pin wheel units for a more facile installation of the leading end of a strip. Hand releasable latches 107 and 108 are pivotally mounted on respective plates 98 and 99 in position to engage respective studs 109 and 110 on the stationary brackets 102 and 101. Engaged with the studs 109 and 110 the latches 107 and 108 hold the described frame assembly in a rocked position wherein the pin wheel units 91 and 92 are in cooperative engagement with the strip, with the strip being held thereon by spring fingers 106 on the base plate 33 and in underlying relation to the pin wheel units.

Figures 1, 11, 12:
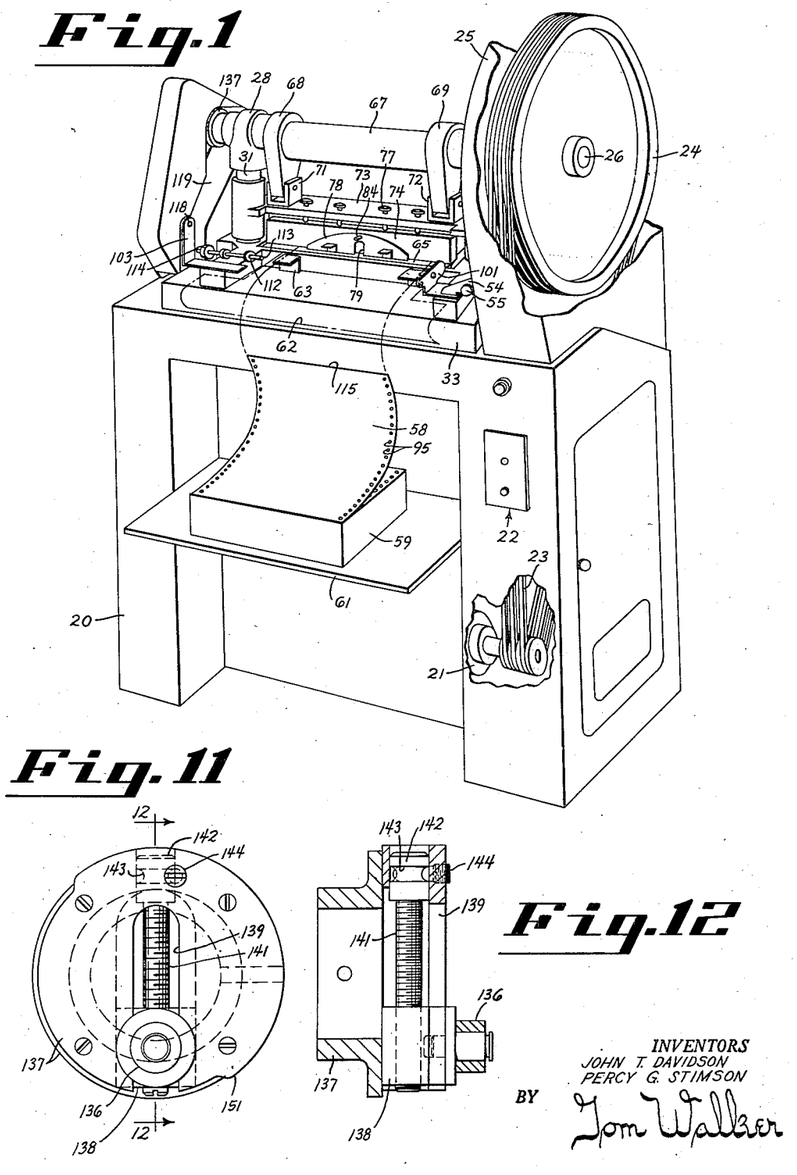
Fig. 1 is a view in perspective of a strip severing apparatus in accordance with the illustrated embodiment of the invention, a part of the frame being broken away to show the manner of driving the apparatus from the power source.
Fig. 11 is a detail view in front elevation of an adjustable cam plate sub-assembly comprised in the actuating devices for the strip feeding means.
Fig. 12 is a view in cross section, taken substantially along the line 12—12 of Fig. 11.
Figure 1A:
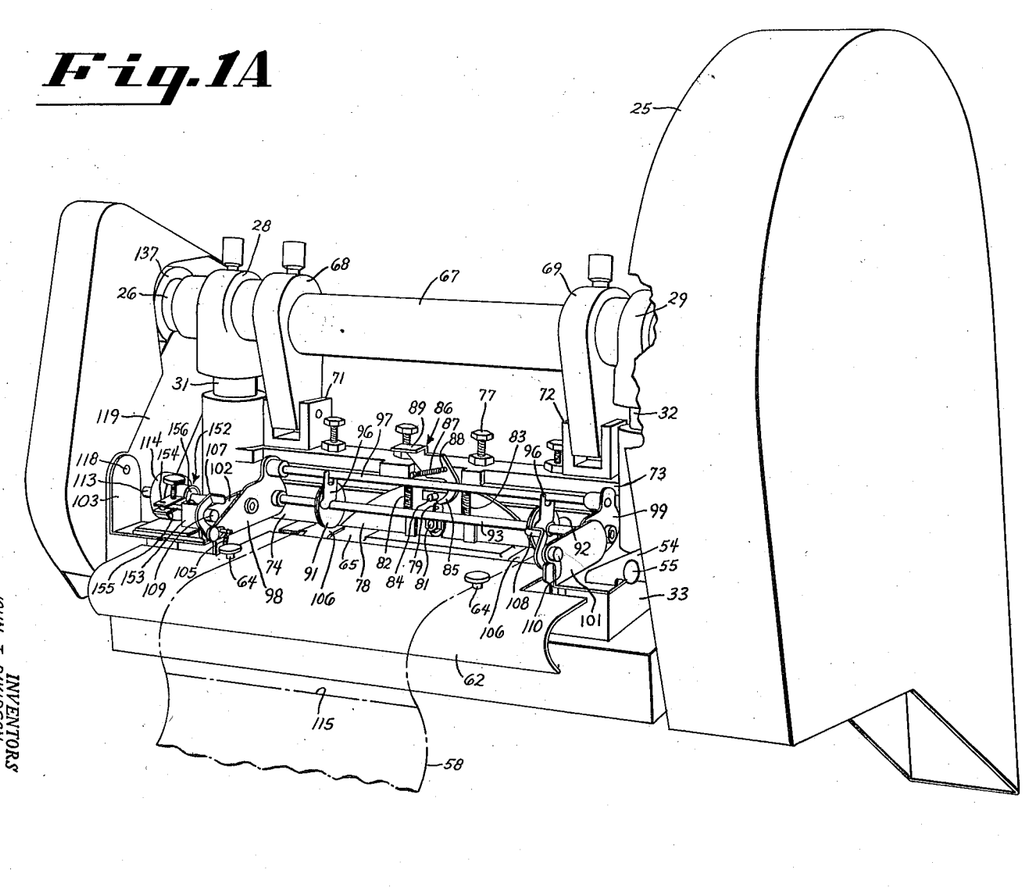
Fig. 1A is a perspective view similar to Fig. 1, showing a portion thereof on an enlarged scale.

At its one end the shaft 93 extends through and beyond the plate 98 and has mounted thereon a gear 111 meshing with a gear 112 on a supplemental shaft 113 in parallel offset relation to the shaft 93 and journaled at its one end in the bracket 102 and at its other end in the bracket 119. The shaft 113 may also be termed the variable shaft since it has mounted thereon a unit 114 adjustable to rotate the shafts 113 and 93 independently of normally effective actuating devices in order that the strip may be initially set manually to a starting position correlating the descent of the cutter element 74 with movement of the strip to provide for cutting of the strip along selected lines, as for example the transverse division lines 115 on the strip, shown in Fig. 1.

Figure 2:
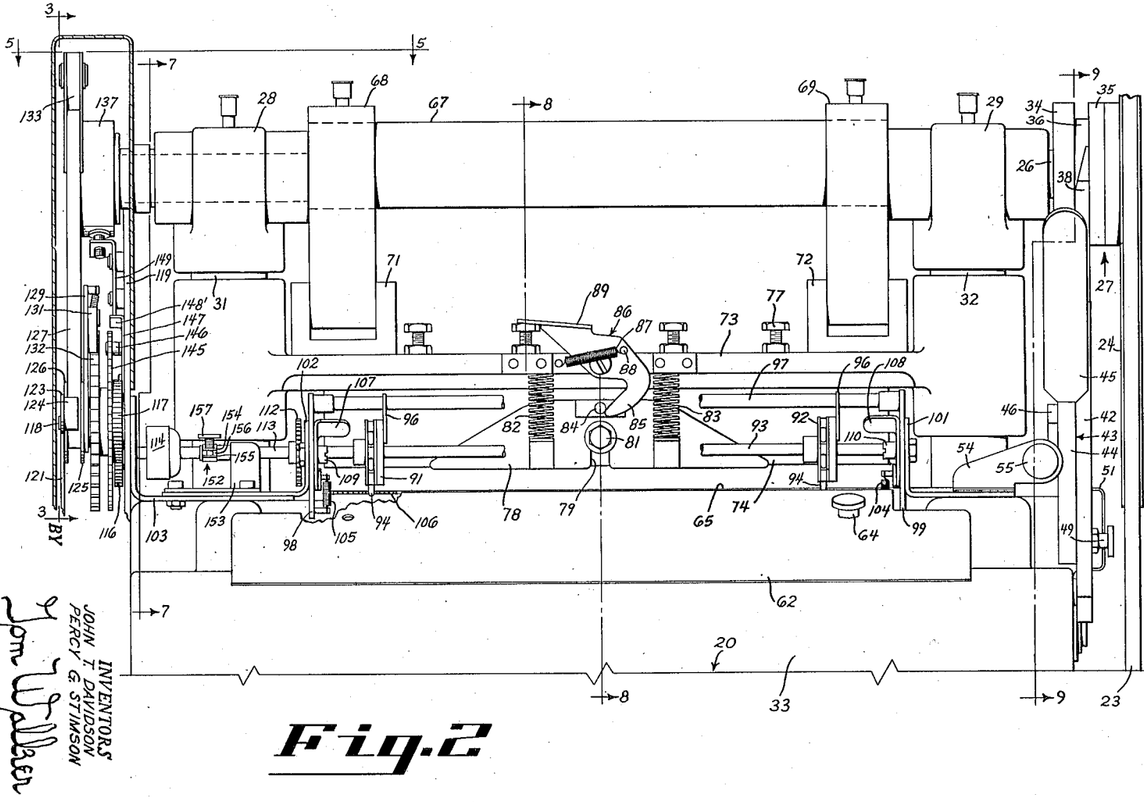
Fig. 2 is a view showing the feeding and severing mechanisms of the apparatus in front elevation, some of the housings therefor being broken away.
Figures 4, 5:
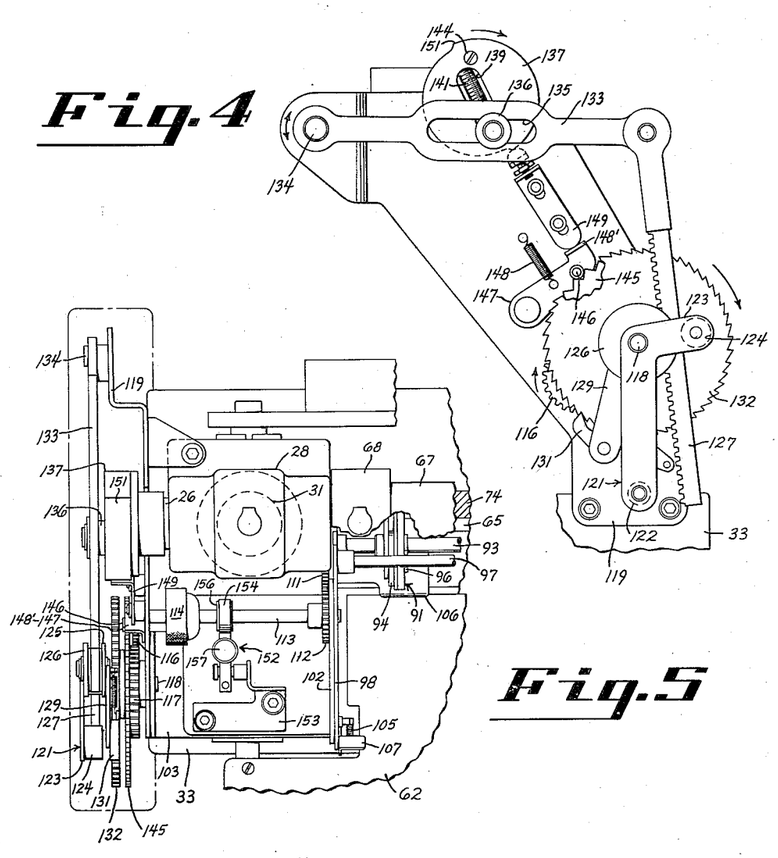
Fig. 4 is a detail view, similar to Fig. 3, showing the actuating devices for the strip feeding means at the end of the feeding stroke.
Fig. 5 is a fragmentary view, in plan, taken substantially along the line 5—5 of Fig. 2.

The outer or left hand end of the shaft 113, as viewed in Figs. 2 and 5, extends through and beyond the bracket 119 and has a gear 116 thereon meshing with a gear 117 which turns on a stub shaft 118 journaled at one end in a plate 119 and at its other end in a bracket 121. The plate 119 is a generally upstanding, elongated member which is secured at its lower end to the base plate 33 and secured at its upper end to the bearing housing 28. The bracket 121 extends between the stub shaft 118 and a laterally projecting boss 122 on the plate 119. An arm 123 thereon mounts a roller 124 and spaced apart discs 125 and 126 forming a guide for a rack 127 meshing with a pinion 128 rotatable on the stub shaft 118. Secured to the side of the pinion 128 is a radially projecting arm 129 carrying a pawl 131 spring urged to engage the periphery of a ratchet 132 free on the stub shaft 118 but fixedly attached to gear 117. The rack 127 extends upwardly in parallel relation to the plate 119 and is connected at its upper end to one end of a crank arm 133 pivotally connected at its other end, as at 134, to the plate 119. Intermediate its ends, the arm 133 is formed with a slot 135 receiving a roller 136 eccentrically mounted on a plate 137 mounted on the end of the crank shaft 26. Rotation of the crank shaft 26 which, as noted, is effective to raise and lower the cutter element 74 is thus also effective to rotate the plate 137 and through the roller 136 thereon to oscillate the arm 133 for a reciprocating motion of the rack 127. Further, it will be seen that the construction and arrangement of parts is such as to provide for an intermittent step by step oscillatory motion of the ratchet 132 in response to continuous rotary motion of the crank shaft 26. Thus, on the downward stroke of the rack 127 the pinion 128 moves in a clockwise direction during which motion the pawl 131 on arm 129 effectively engages the teeth on the rack 132, causing the ratchet to turn with the pinion. On the upward stroke of the rack, however, the pawl 131 is carried idly over the teeth on the ratchet 132 and no corresponding motion of the ratchet results. Since the ratchet 132 is rotatable on the stub shaft 118 it will be understood that the motion of the ratchet effects a corresponding motion of the pin wheel shaft 93, through gears 117—116, the variable shaft 113, and gears 112—111, and so effects an advance of the strip 58 through the machine by virtue of the engagement of the rotary pin wheels 91 and 92 therewith.

The extent of each increment of movement of the strip 58 through the machine bears a direct relation to the extent of permitted movement of the rack 127 and this in turn is a function of the location of the roller 136 with respect to the axis of the disc or plate 137. So that this latter location may be changed, whereby to change the extent of advance of the strip, the roller 136 is installed in a block 138 received in a slot 139 in the plate 137 and having a threaded mounting on a bolt or post 141. The latter is received in the slot 139 and has a head 142 having a circumferential groove 143 receiving a screw stud 144. The upper end of the head 142 has a slot for a screw driver or like implement and is accessible for the use of such an implement in order that the bolt or post 141 may be turned in either direction about its longitudinal axis. Since the bolt is prevented by the stud 144 from moving in an axial direction, turning motion thereof as described results in longitudinal advancing or retracting motions of the block 138 therealong. The roller 136 may thereby be positioned more closely to or more distant from the axis of the plate 137 and the throw or permitted motion of the crank arm 133 during each revolution of the crank shaft accordingly is decreased and increased.

Figure 3:
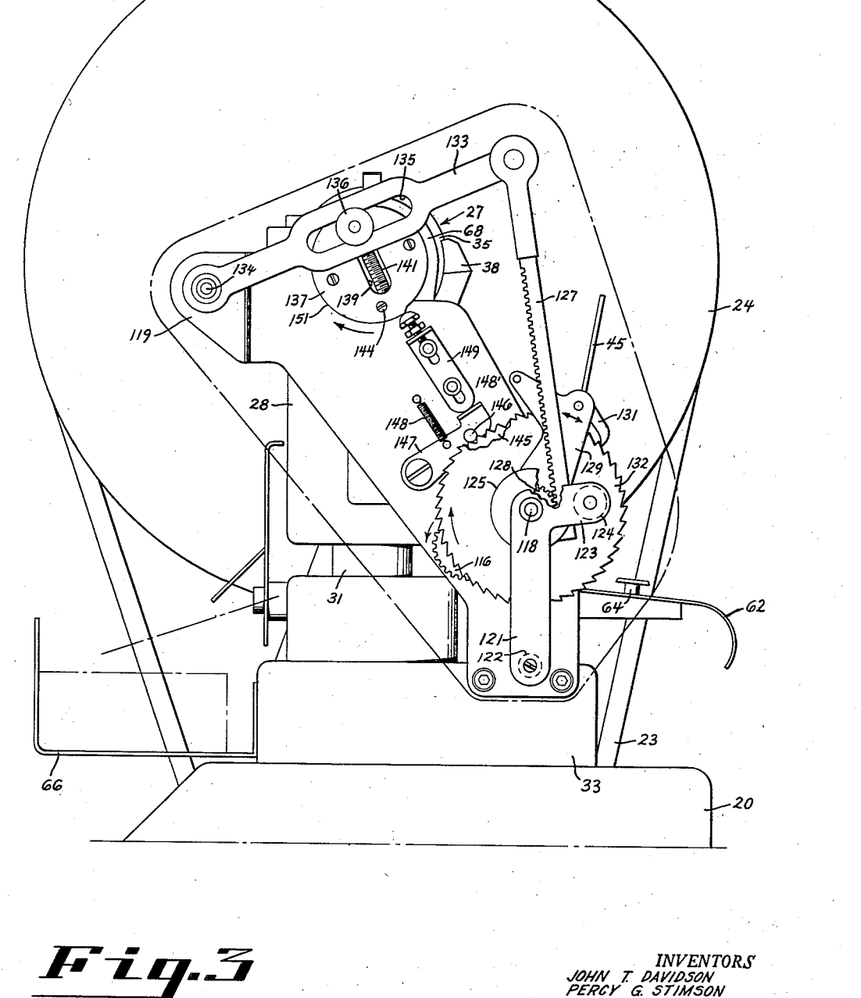
Fig. 3 is a view in cross section, taken substantially along the line 3—3 of Fig. 2, showing the actuating devices for the strip feeding means as they appear at the start of a feeding stroke.

In order that the strip 58 may be held against motion during the retracting motion of the rack 127, which is likewise the descending or cutting stroke of the movable cutter element 74, there is provided a detent member 145 secured to the ratchet 132 in side by side relation thereto. The periphery of the member 145 is serrated and engaged by a roller 146 on the side of an arm 147 pivotally mounted on the plate 119. A spring 148 urges the arm 147 normally upward or in a direction to disengage the roller 146 from the serrated edge of the member 145. The outer or free end of the arm 147 is formed with a turned over ear 148' engaged by the lower end of a slide 149 mounted for relative reciprocal motion on the side of the plate 119. The other or upper end of the slide 149 engages the peripheral edge of the disc plate 137 which, as indicated, is formed over a part of its length with an elevated cam surface 151. When the raised surface 151 of the disc 137 is in engagement with the slide 149 the arm 147 is rocked downward against the urging of spring 148 and roller 146 is engaged with serrations on the member 145. As rotation of the plate 137 removes the high part thereof from contact with the slide 149, the spring 148 is enabled to lift the arm 148, as from the position shown in Fig. 3 to the position shown in Fig. 4, raising the roller 146 from contact with the member 145 and freeing the ratchet 132 and associated parts for movement. It will be understood that the position of the disc or plate 137 initially is predetermined so that the ratchet 132 is released for motion during the downward stroke of the rack 127 and is gripped or held from motion during the return stroke of the rack.

Figure 7:
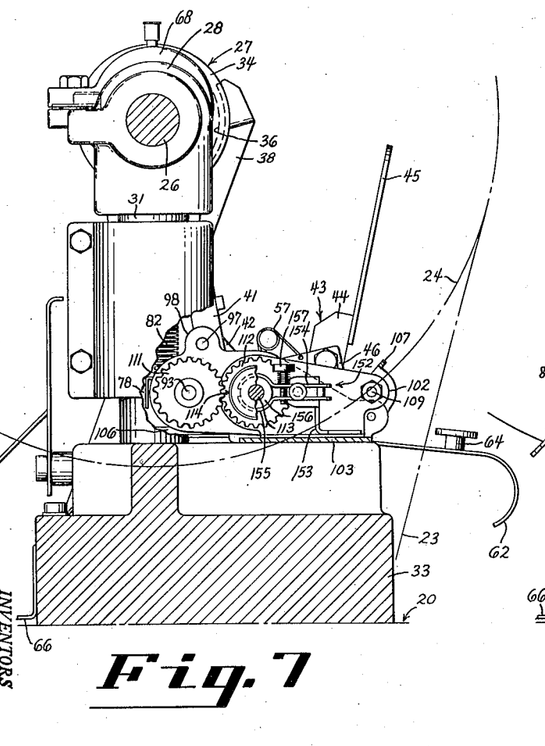
Fig. 7 is a view in cross section, taken substantially along the line 7—7 of Fig. 2.

To obviate an overtravel of the ratchet 132 and thereby to prevent overfeeding of the strip, there is provided a brake assembly 152 (Fig. 7) which includes bracket means 153 stationarily mounted on the bracket 102. The brake assembly further comprises an upper brake shoe 154 and a lower brake shoe 155 in relatively embracing, contacting relation to a bearing member 156 fixed to the shaft 113. A thumb screw 157 interconnects the shoes 155 and 154 and is adjustable to vary the pressure applied thereby to the bearing 156. The construction and function of the brake assembly thus is to apply a pressure to the shaft 113 in restraint of rotation thereof. Any tendency, therefore, for the ratchet 132 to slip before the roller 146 engages the detent member 145 thus is inhibited.

As above noted, the strip severing mechanism and the strip feeding devices operate in a timed relation with one another and under a common motivation, namely the rotation of crank shaft 26. The result, in the continued operation of the machine, is a continuing intermittent advance of the strip under feeding motions of uniform extent presenting successive portions of accurately predetermined, uniform length to the severing mechanism which operates between successive feeding increments to cut such portions from the strip. Operation of the machine, as also noted, is initiated by actuation of the member 45 and continues without interruption until depression of the plunger 53.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. Strip severing apparatus, including a relatively stationary base, a stationary cutter element on said base, a movable cutter element in overlying relation to said stationary cutter element, means for guiding marginally perforated strip material between said cutter elements, spaced apart bracket means on said base, plates pivotally mounted on said bracket means, a shaft supported between said plates in transverse relation to the path of movement defined for the strip, and rotary pin wheels on said shaft engageable with perforations in the strip, said plates being movable on said bracket means to shift said pin wheels out of cooperative relation with the strip.

2. Strip severing apparatus according to claim 1, characterized by interengageable latch elements on said bracket means and on said plates for holding said plates in a selected position of adjustment relatively to said bracket means.

3. Strip severing apparatus according to claim 1, characterized by means for rotating said shaft, including a supplemental shaft in parallel offset relation to the first said shaft and supported on said base without freedom of bodily shifting motion, and gear means on said shafts meshed and unmeshed by adjustment of said plates on said bracket means.

4. Strip severing apparatus including a relatively stationary base; a stationary cutter element on said base; a movable cutter element in overlying relation to said stationary cutter element; means for guiding marginally perforated strip material between said cutter elements; spaced apart bracket means on said base; a pin wheel feed assembly supported between said bracket means for relative pivotal movement, said assembly including spaced apart plates, a shaft supported between said plates in transverse relation to the path of movement defined for the strip, and rotary pin wheels on said shaft engageable with perforations in the strip; resilient means urging said assembly in a direction to disengage said pin wheels from the strip; and releasable latch means holding said assembly in a position in which said pin wheels engage the strip against the urging of said resilient means.

5. Strip severing apparatus including a base, means for guiding a strip over said base, relatively reciprocable cutter elements between which said strip is guided, a rotary crank shaft supported on said base and connected to one of said cutter elements to move said one element toward and from the other one of said elements in response to rotation of said crankshaft, means for advancing the strip in response to rotation of said crankshaft, power means, a clutch engageable for rotation of said crankshaft by said power means, means for engaging said clutch, means for latching said clutch in engaged position, and means for releasing said latching means, said means for engaging said clutch and said means for releasing said latching means being comprised in separate manual controls mounted on the base at the front of the machine in side by side adjacent relation to one another for manipulation by the hand of the operator.

References Cited in the file of this patent

UNITED STATES PATENTS

| | | |
|---|---|---|
| 332,138 | Cox | Dec. 8, 1885 |
| 524,501 | Kendall | Aug. 14, 1894 |
| 677,518 | Jacobs | July 2, 1901 |
| 799,890 | Claus | Sept. 19, 1905 |
| 1,039,124 | Harbrecht | Sept. 24, 1912 |
| 1,173,904 | Vickery | Feb. 29, 1916 |
| 1,348,976 | Antman | Aug. 10, 1920 |
| 1,464,963 | Balch et al. | Aug. 14, 1923 |
| 1,543,434 | Hardman | June 23, 1925 |
| 1,910,387 | Hahn | May 23, 1933 |
| 1,916,379 | Leland | July 4, 1933 |
| 1,927,585 | Fischer et al. | Sept. 19, 1933 |

FOREIGN PATENTS

| | | |
|---|---|---|
| 520,276 | France | Feb. 11, 1921 |